United States Patent
Ramb et al.

(10) Patent No.: US 9,664,198 B2
(45) Date of Patent: May 30, 2017

(54) EXHAUST-GAS TURBOCHARGER

(71) Applicant: BorgWarner Inc., Auburn Hills, MI (US)

(72) Inventors: Thomas Ramb, Worms (DE); Dietmar Metz, Meckenheim (DE); Christian Haibt, Alsbach-Haehnlein (DE); Julia Nohl, Bruchweiler-Baerenbach (DE)

(73) Assignee: BorgWarner Inc., Auburn Hills, MI (US)

( * ) Notice: Subject to any disclaimer, the term of this patent is extended or adjusted under 35 U.S.C. 154(b) by 344 days.

(21) Appl. No.: 14/396,130

(22) PCT Filed: Apr. 19, 2013

(86) PCT No.: PCT/US2013/037328
§ 371 (c)(1),
(2) Date: Oct. 22, 2014

(87) PCT Pub. No.: WO2013/163024
PCT Pub. Date: Oct. 31, 2013

(65) Prior Publication Data
US 2015/0086340 A1 Mar. 26, 2015

(30) Foreign Application Priority Data
Apr. 27, 2012 (DE) .......... 10 2012 008 588

(51) Int. Cl.
*F01D 17/16* (2006.01)
*F04D 27/00* (2006.01)
(Continued)

(52) U.S. Cl.
CPC ......... *F04D 27/002* (2013.01); *F01D 17/165* (2013.01); *F02C 6/12* (2013.01); *F04D 19/00* (2013.01); *F05D 2220/40* (2013.01)

(58) Field of Classification Search
CPC ..... F01D 17/165; F05D 2250/90; F02B 37/24
See application file for complete search history.

(56) References Cited

U.S. PATENT DOCUMENTS 2,860,827 A * 11/1958 Egli .................. F01D 5/025
277/412
6,907,733 B2 * 6/2005 Nishiyama ............ F01D 17/165
29/889.22

(Continued)

FOREIGN PATENT DOCUMENTS

| JP | 2008075635 A | 4/2008 |
|---|---|---|
| JP | 2009180111 A | 8/2009 |
| WO | 2010120028 A1 | 10/2010 |

OTHER PUBLICATIONS

International Search Report in International Application No. PCT/US2013/037328 dated Jul. 29, 2013.

*Primary Examiner* — Ninh H Nguyen
(74) *Attorney, Agent, or Firm* — Eric L. Doyle; Stephan A. Pendorf; Patent Central LLC

(57) ABSTRACT

An exhaust-gas turbocharger (1) having a turbine (2), which has a turbine wheel (3) surrounded by an intake duct (4), and having a VTG cartridge (5), which has a disk (6) and a vane bearing ring (7), which delimit the intake duct (4), and which has a plurality of vanes (8), which are arranged in the intake duct (4) and are mounted in the vane bearing ring (7) by way of rotatable vane shafts (9), which are connected to vane levers (10), the lever heads (11) of which engage into associated grooves (12) in a unison ring (13), which surrounds the vane bearing ring (7) on the outside, and which has an adjusting lever (14) which is operatively connected to an adjusting shaft (15) in order to transmit an adjusting torque to the unison ring (13). The adjusting lever (14) is of planar configuration.

10 Claims, 2 Drawing Sheets

(51) Int. Cl.
   *F02C 6/12* (2006.01)
   *F04D 19/00* (2006.01)

(56) References Cited

U.S. PATENT DOCUMENTS

| | | | | |
|---|---|---|---|---|
| 7,114,919 B2 * | 10/2006 | Scholz | ............... | F01D 17/165 415/164 |
| 7,559,199 B2 * | 7/2009 | Sausse | ............... | F01D 17/165 415/159 |
| 2009/0092483 A1 * | 4/2009 | Yasui | ............... | F01D 17/165 415/159 |
| 2009/0123272 A1 | 5/2009 | Love et al. | | |
| 2009/0301083 A1 | 12/2009 | Rayner et al. | | |

\* cited by examiner

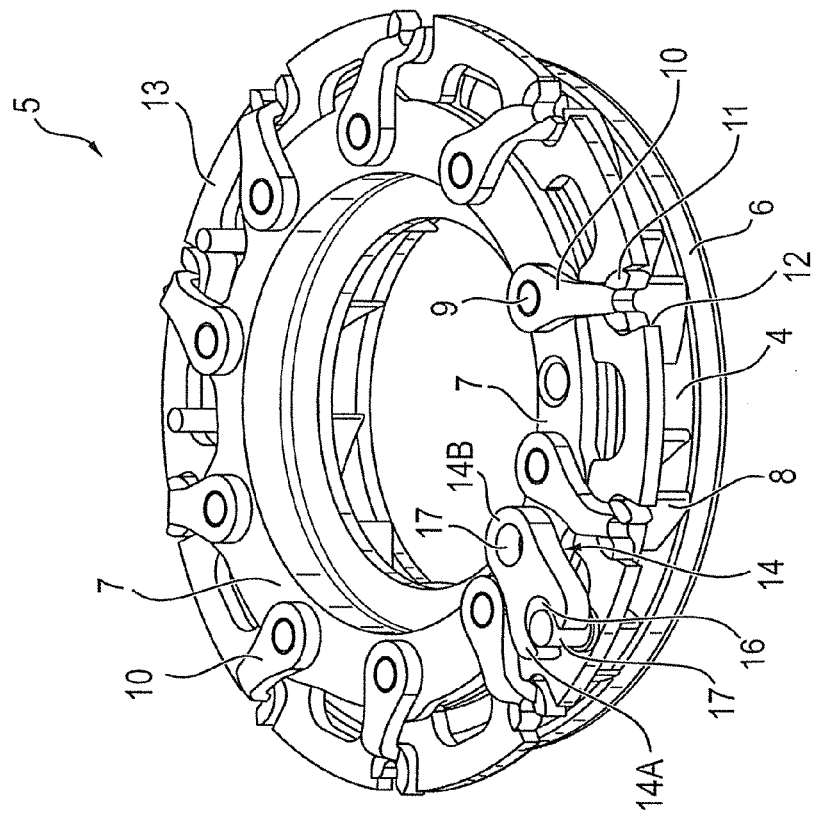
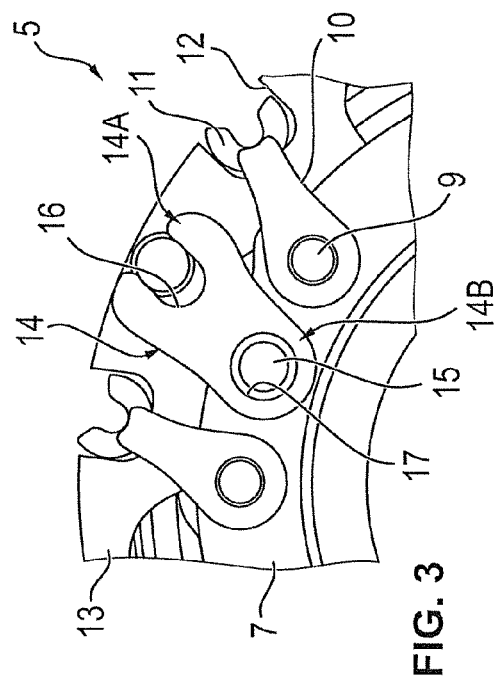
FIG. 3
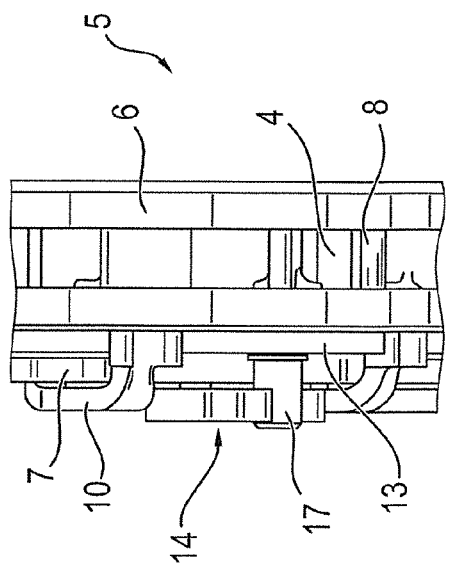
FIG. 4
FIG. 2

EXHAUST-GAS TURBOCHARGER

The invention relates to an exhaust-gas turbocharger according to the preamble of claim 1.

In the case of such an exhaust-gas turbocharger, provision is made of a variable turbine geometry (VTG), in which guide vanes are adjusted by means of a unison ring, which can be rotated by means of an adjusting shaft.

It is an object of the present invention to provide an exhaust-gas turbocharger of the type described in the preamble of claim 1, in which the bearing forces in the system of the VTG and in particular of the adjusting shaft can be reduced.

This object is achieved by the features of claim 1.

The dependent claims contain advantageous developments of the invention.

Claims 7 and 8 define a VTG cartridge according to the invention as an object which can be marketed independently.

Further details, features and advantages of the invention become apparent from the following description of exemplary embodiments with reference to the drawing, in which:

FIG. 2 shows a perspective plan view of a first embodiment of a VTG cartridge according to the invention, FIG. 3 shows an enlarged partial view of the VTG cartridge shown in FIG. 2, and FIG. 4 shows a partial side view of the VTG cartridge according to the invention.

FIG. 1 shows a schematically greatly simplified basic illustration of an exhaust-gas turbocharger 1 according to the invention, which has a charger axis of rotation L.

Figure 1:
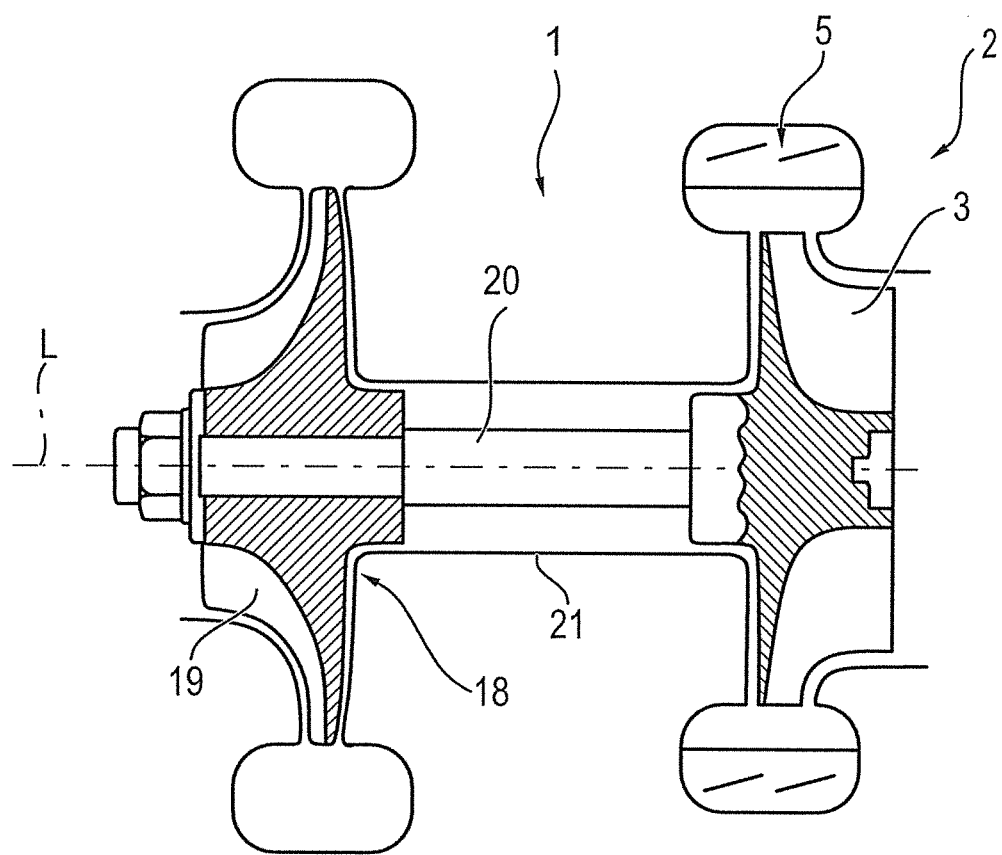
FIG. 1 shows a schematically greatly simplified illustration of an exhaust-gas turbocharger according to the invention.

The exhaust-gas turbocharger 1 also has a turbine 2, which comprises a turbine wheel 3 surrounded by an intake duct 4, which is provided with a so-called VTG cartridge 5. This VTG cartridge 5 will be described in detail hereinbelow with reference to FIGS. 2 to 4.

The exhaust-gas turbocharger 1 also of course has all the other common parts of an exhaust-gas turbocharger, such as a rotor 20, which is mounted rotatably in a bearing housing 21 and which bears the turbine wheel 3 at one end and a compressor wheel 19 of a compressor 18 at the other end. These parts are likewise shown only in schematically greatly simplified form in FIG. 1, since they are not of importance for explaining the principles of the present invention.

The VTG cartridge, which, as mentioned, will be explained in detail hereinbelow with reference to FIGS. 2 to 4, is likewise shown in greatly schematically simplified form.

A VTG cartridge is understood to mean a structural unit which, between a vane bearing ring 7 and a disk 6, delimits an intake duct 4 for the passage of exhaust gases to the turbine wheel 3. Furthermore, a VTG cartridge 5 of this type has a plurality of vanes, which are arranged in the intake duct 4 and of which FIGS. 2 and 4 show one vane designated 8 as a representative example of all vanes bearing the corresponding reference numeral. The vanes 8 can be moved rotatably in the vane bearing ring 7 between a closed and an open position. For this purpose, the vanes 8 have vane shafts 9 each having an axis of rotation. The vane shafts 9 in turn are connected to vane levers 10, of which two vane levers are denoted in each case in FIG. 2 with the reference numeral 10. As FIG. 2 shows, the embodiment shown there has ten such, preferably cranked vane levers, in each case of identical design, and correspondingly ten vanes 8.

Each vane lever 10 has a lever head 11, which engages into an associated groove 12 in a unison ring 13. FIG. 2 shows in this respect that the unison ring 13 surrounds the vane bearing ring 7 on the outside, i.e. along the outer circumference thereof.

For radially mounting the unison ring 13, provision is made of a radial bearing, which according to the invention is formed by the vane levers 10. For this purpose, the vane levers 10 are formed as rolling levers, the lever heads 11 of which are supported in the grooves 12 in the unison ring 13. FIGS. 2 and 4 show that the grooves 12 are arranged in a plane that is offset with respect to the bearing plane of the vane levers 10 on the vane bearing ring 7, which is the reason for the cranked configuration of the vane levers 10 in this embodiment.

As can be seen when FIGS. 2 to 4 are viewed in combination, the exhaust-gas turbocharger 1 according to the invention, or the VTG cartridge 5 according to the invention, also has an adjusting lever 14, which is operatively connected to an adjusting shaft 15 (which can be seen in FIG. 3) for transmitting an adjusting torque to the unison ring 13. The adjusting shaft 15 can be actuated by means of a suitable actuator which is known per se and is not shown in detail in FIGS. 2 to 4, since it is not necessary for the purposes of explaining the principles of the present invention.

However, FIGS. 2 to 4 do illustrate that the adjusting lever 14 is of planar configuration. Here, the adjusting lever 14 has a first end region 14A, which in the assembled state is adjacent to the adjusting lever 13 and which has a groove 16 that engages around a positioning pin 17. The positioning pin 17 is fixed on the unison ring 13, preferably is welded onto the unison ring 13.

As can also be seen from FIGS. 2 to 4, the groove 16 is open on one side, which results in a fork-like structure of the first end region 14A, as can be seen in particular from the illustration presented in FIG. 3.

The adjusting lever 14 also has a second end region 14B, which is arranged adjacent to the vane bearing ring 7, in particular above the vane bearing ring 7, and is provided with a recess 17 in which the adjusting shaft 15 is fixed. In FIG. 2, only the recess 17 can be seen, whereas FIG. 3 shows a schematically simplified representation of the arrangement of the adjusting shaft 15 in the recess 17. The adjusting shaft 15 may for example be welded in the recess 17.

In addition to the above written disclosure, reference is hereby explicitly made to the illustrative representation of the invention in FIGS. 1 to 4 to supplement the disclosure of the invention.

LIST OF REFERENCE SIGNS

1 Exhaust-gas turbocharger
2 Turbine
3 Turbine wheel
4 Intake duct
5 VTG cartridge
6 Disk
7 Vane bearing ring
8 Vanes
9 Vane shafts
10 Vane levers
11 Lever heads
12 Grooves
13 Unison ring
14 Adjusting lever
14A, 14B End regions of the unison ring 15 Adjusting shaft
16 Groove
17 Positioning pin
L Charger longitudinal axis

The invention claimed is:

1. An exhaust-gas turbocharger (1) having
a turbine (2),
   which has a turbine wheel (3) surrounded by an intake duct (4), and
a VTG cartridge (5),
   which has a disk (6) and a vane bearing ring (7), which delimit the intake duct (4),
   which has a plurality of vanes (8), which are arranged in the intake duct (4) and mounted in the vane bearing ring (7) by way of rotatable vane shafts (9), which are connected to vane levers (10), the vane levers having a cranked configuration, the lever heads (11) having a circular circumference which engages into associated grooves (12) in a unison ring (13), which surrounds the vane bearing ring (7) on the outside, the grooves (12) arranged in a plane that is offset with respect to a bearing plane of the vane levers (10) on the vane bearing ring (7), the lever heads (11) of the vane levers (10) forming a radial bearing which supports the unison ring (13), and
   which has an adjusting lever (14) which is operatively connected to an adjusting shaft (15) in order to transmit an adjusting torque to the unison ring (13), wherein
the adjusting lever (14) is of planar configuration.

2. The exhaust-gas turbocharger as claimed in claim 1, wherein the adjusting lever (14), in a first end region (14A) adjacent to the unison ring (13), has a groove (16) which engages around a positioning pin (17) that is fixed on the unison ring (13).

3. The exhaust-gas turbocharger as claimed in claim 2, wherein the groove (16) is open on one side.

4. The exhaust-gas turbocharger as claimed in claim 1, wherein the adjusting lever (14) has a second end region (14B) which is adjacent to the vane bearing ring (7) and is provided with a recess (17) in which the adjusting shaft (15) is fixed.

5. The exhaust-gas turbocharger as claimed in claim 2, wherein the positioning pin (17) is welded to the unison ring (13).

6. A VTG cartridge (5) of an exhaust-gas turbocharger (1), having
   a disk (6) and a vane bearing ring (7), which delimit an intake duct (4),
   a plurality of vanes (8), which are arranged in the intake duct (4) and mounted in the vane bearing ring (7) by way of rotatable vane shafts (9), which are connected to vane levers (10), the vane levers having a cranked configuration, the lever heads (11) having a circular circumference which engages into associated grooves (12) in a unison ring (13), which surrounds the vane bearing ring (7) on the outside, the grooves (12) arranged in a plane that is offset with respect to a bearing plane of the vane levers (10) on the vane bearing ring (7), the lever heads (11) of the vane levers (10) forming a radial bearing which supports the unison ring (13), and
   an adjusting lever (14) which is operatively connected to an adjusting shaft (15) in order to transmit an adjusting torque to the unison ring (13),
wherein
   the adjusting lever (14) is of planar configuration.

7. The VTG cartridge as claimed in claim 6, wherein the adjusting lever (14), in a first end region (14A) adjacent to the unison ring (13), has a groove (16) which engages around a positioning pin (17) that is fixed on the unison ring (13).

8. The VTG cartridge as claimed in claim 7, wherein the groove (16) is open on one side.

9. The VTG cartridge as claimed in claim 7, wherein the positioning pin (17) is welded to the unison ring (13).

10. The VTG cartridge as claimed in claim 6, wherein the adjusting lever (14) has a second end region (14B) which is adjacent to the vane bearing ring (7) and is provided with a recess (17) in which the adjusting shaft (15) is fixed.

* * * * *